(12) United States Patent
Beard et al.

(10) Patent No.: US 11,493,712 B2
(45) Date of Patent: Nov. 8, 2022

(54) HYBRID PORT TO LEGACY PORT CONVERTER

(71) Applicant: Dell Products L.P., Round Rock, TX (US)

(72) Inventors: Neal Beard, Austin, TX (US); Shree Rathinasamy, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/223,854

(22) Filed: Apr. 6, 2021

(65) Prior Publication Data
US 2022/0317396 A1    Oct. 6, 2022

(51) Int. Cl.
*H04B 10/00*     (2013.01)
*G02B 6/42*      (2006.01)
*H04B 10/40*     (2013.01)

(52) U.S. Cl.
CPC ......... *G02B 6/4284* (2013.01); *G02B 6/4279* (2013.01); *H04B 10/40* (2013.01)

(58) Field of Classification Search
CPC combination set(s) only.
See application file for complete search history.

(56) References Cited

U.S. PATENT DOCUMENTS

| | | | | |
|---|---|---|---|---|
| 7,481,584 B2* | 1/2009 | Cairns | ................. | H01R 13/523 385/60 |
| 7,572,063 B2* | 8/2009 | Mynott | ................ | G02B 6/3817 385/79 |
| 8,616,781 B2* | 12/2013 | Knapp | ................. | G02B 6/3853 385/61 |
| 9,106,981 B2* | 8/2015 | Vastmans | .............. | H02G 15/076 |
| 9,742,176 B2* | 8/2017 | Wang | ..................... | H02G 3/088 |
| 9,755,382 B2* | 9/2017 | Gniadek | ................ | H01R 24/66 |
| 10,101,548 B2* | 10/2018 | Isenhour | .............. | G02B 6/4293 |
| 10,234,635 B1* | 3/2019 | Fabian | ................. | G02B 6/3817 |
| 10,396,512 B2* | 8/2019 | Gniadek | .............. | G02B 6/3879 |
| 10,768,375 B2* | 9/2020 | Leigh | .................... | G02B 6/3885 |
| 11,048,048 B2* | 6/2021 | Bretz | .................... | G02B 6/3817 |
| 11,150,427 B2* | 10/2021 | Paddick | .............. | G02B 6/4441 |
| 11,215,766 B2* | 1/2022 | Matsuda | .............. | G02B 6/3847 |
| 2007/0014522 A1* | 1/2007 | Yamaguchi | .......... | G02B 6/3817 385/100 |
| 2008/0205816 A1* | 8/2008 | Lu | ........................ | G02B 6/4292 385/14 |
| 2011/0229090 A1* | 9/2011 | Isenhour | .............. | G02B 6/4246 385/78 |

(Continued)

*Primary Examiner* — Agustin Bello
(74) *Attorney, Agent, or Firm* — Jackson Walker L.L.P.

(57) ABSTRACT

An integrated transceiver module may be configured to convert optical signals received by optical transmission media of the hybrid optical/electrical connector and convert such optical signals into equivalent electrical signals and drive such equivalent electrical signals to electrically-conductive conduits of the electrical connector and convert electrical signals received by electrically-conductive conduits of the electrical connector and convert such electrical signals into equivalent optical signals and drive such equivalent optical signals to the optical transmission media of the hybrid optical/electrical connector, such that the device can communicate with a hybrid optical/electrical port of an information handling system via the cable.

8 Claims, 2 Drawing Sheets

(56) References Cited

U.S. PATENT DOCUMENTS

| | | | |
|---|---|---|---|
| 2015/0309271 A1* | 10/2015 | Huegerich | G02B 6/4284 |
| | | | 385/101 |
| 2015/0378122 A1* | 12/2015 | Simmons | G02B 6/4471 |
| | | | 439/529 |
| 2016/0020911 A1* | 1/2016 | Sipes, Jr. | H04B 10/40 |
| | | | 398/16 |
| 2016/0266326 A1* | 9/2016 | Gniadek | H01R 24/66 |
| 2017/0023752 A1* | 1/2017 | Isenhour | G02B 3/0087 |
| 2017/0038537 A1* | 2/2017 | Bushnell | G02B 6/3885 |
| 2017/0117971 A1* | 4/2017 | Sipes, Jr. | H04B 10/808 |
| 2017/0141563 A1* | 5/2017 | Islam | G02B 6/4416 |
| 2018/0219635 A1* | 8/2018 | Sipes, Jr. | G02B 6/4293 |
| 2020/0081212 A1* | 3/2020 | Zhou | H01R 13/521 |

* cited by examiner

HYBRID PORT TO LEGACY PORT CONVERTER

TECHNICAL FIELD

The present disclosure relates in general to information handling systems, and more particularly to systems and methods for providing a hybrid optical and electrical port to legacy electrical port converter.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

An information handling system may have a network interface or other input/output (I/O) interface having a hybrid optical/electrical port, including an optical interface for communication of data via a hybrid cable and an electrical interface for delivery of electrical energy via the hybrid cable. Accordingly, a device coupled to the hybrid optical/electrical port via the cable may be powered from the hybrid optical/electrical port. For example, Power-over-Ethernet may be implemented in such a manner.

While connectivity of hybrid optical/electrical ports to next-generation Power-over-Ethernet powered devices may be possible as such devices may be manufactured with integrated optical ports and electrical power pins, existing legacy devices having only electrical interfaces (e.g., devices having RJ-45 connectors) may not be supported by the hybrid optical/electrical ports.

SUMMARY

In accordance with the teachings of the present disclosure, the disadvantages and problems associated with coupling legacy electrical port devices to hybrid optical/electrical ports may be reduced or eliminated.

In accordance with embodiments of the present disclosure, a hybrid optical/electrical port to electrical port converter may include a hybrid optical/electrical connector, an electrical connector, and a circuit electrically and communicatively coupled between the hybrid optical/electrical connector and the electrical connector. The circuit may include a power mapping module interfaced between the hybrid optical/electrical connector and the electrical connector and configured to map electrical power rails from electrically-conductive conduits of the hybrid optical/electrical connector to electrically-conductive conduits of the electrical connector, such that a device coupled to the electrical connector can be powered from a cable coupled to the hybrid optical/electrical connector and an integrated transceiver module interfaced between the hybrid optical/electrical connector and the electrical connector. The integrated transceiver module may be configured to convert optical signals received by optical transmission media of the hybrid optical/electrical connector and convert such optical signals into equivalent electrical signals and drive such equivalent electrical signals to electrically-conductive conduits of the electrical connector and convert electrical signals received by electrically-conductive conduits of the electrical connector and convert such electrical signals into equivalent optical signals and drive such equivalent optical signals to the optical transmission media of the hybrid optical/electrical connector, such that the device can communicate with a hybrid optical/electrical port of an information handling system via the cable.

In accordance with embodiments of the present disclosure, a method for fabricating a hybrid optical/electrical port to electrical port converter may include electrically and communicatively coupling a circuit between a hybrid optical/electrical connector and an electrical connector, wherein the circuit comprises a power mapping module interfaced between the hybrid optical/electrical connector and the electrical connector and configured to map electrical power rails from electrically-conductive conduits of the hybrid optical/electrical connector to electrically-conductive conduits of the electrical connector, such that a device coupled to the electrical connector can be powered from a cable coupled to the hybrid optical/electrical connector and an integrated transceiver module interfaced between the hybrid optical/electrical connector and the electrical connector. The integrated transceiver module may be configured to convert optical signals received by optical transmission media of the hybrid optical/electrical connector and convert such optical signals into equivalent electrical signals and drive such equivalent electrical signals to electrically-conductive conduits of the electrical connector and convert electrical signals received by electrically-conductive conduits of the electrical connector and convert such electrical signals into equivalent optical signals and drive such equivalent optical signals to the optical transmission media of the hybrid optical/electrical connector, such that the device can communicate with a hybrid optical/electrical port of an information handling system via the cable.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
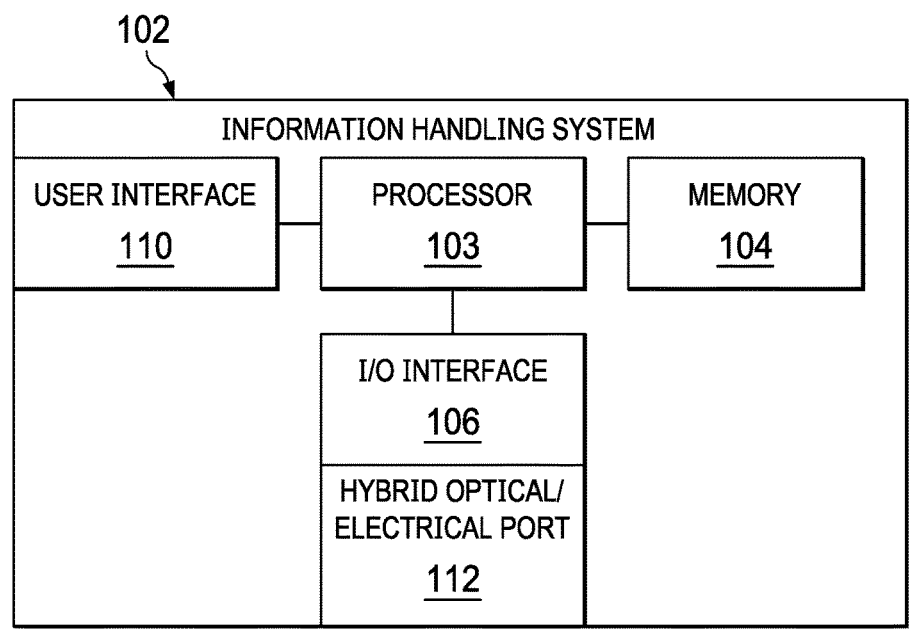
FIG. 1 illustrates a block diagram of selected components of an example information handling system, in accordance with embodiments of the present disclosure.
Figure 3:
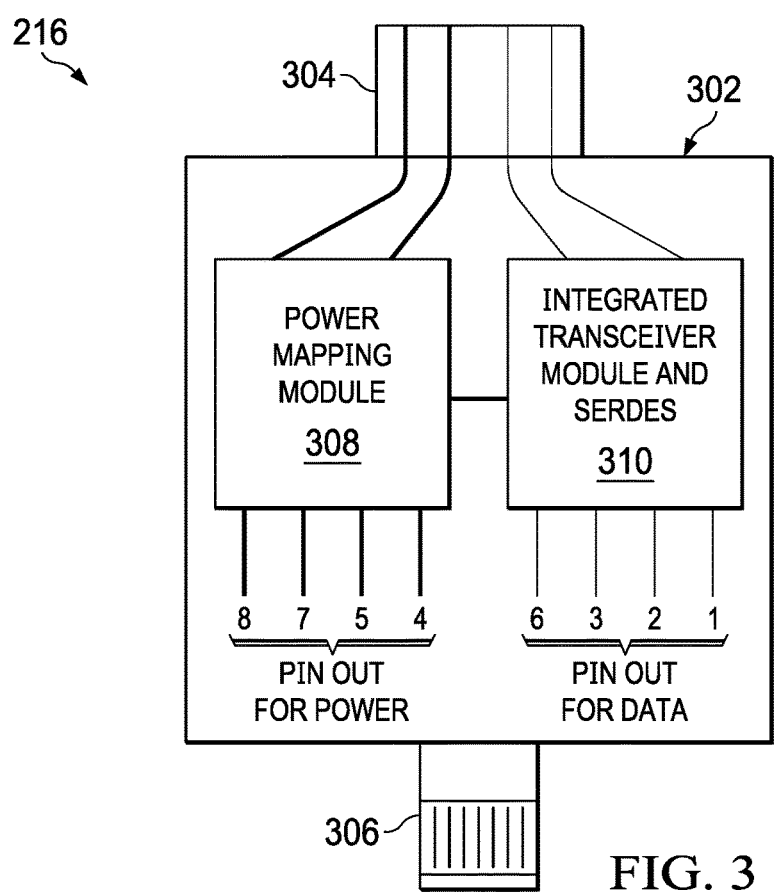
FIG. 3 illustrates a block diagram of an example hybrid optical/electrical port to legacy electrical port converter, in accordance with embodiments of the present disclosure.
Figure 2:
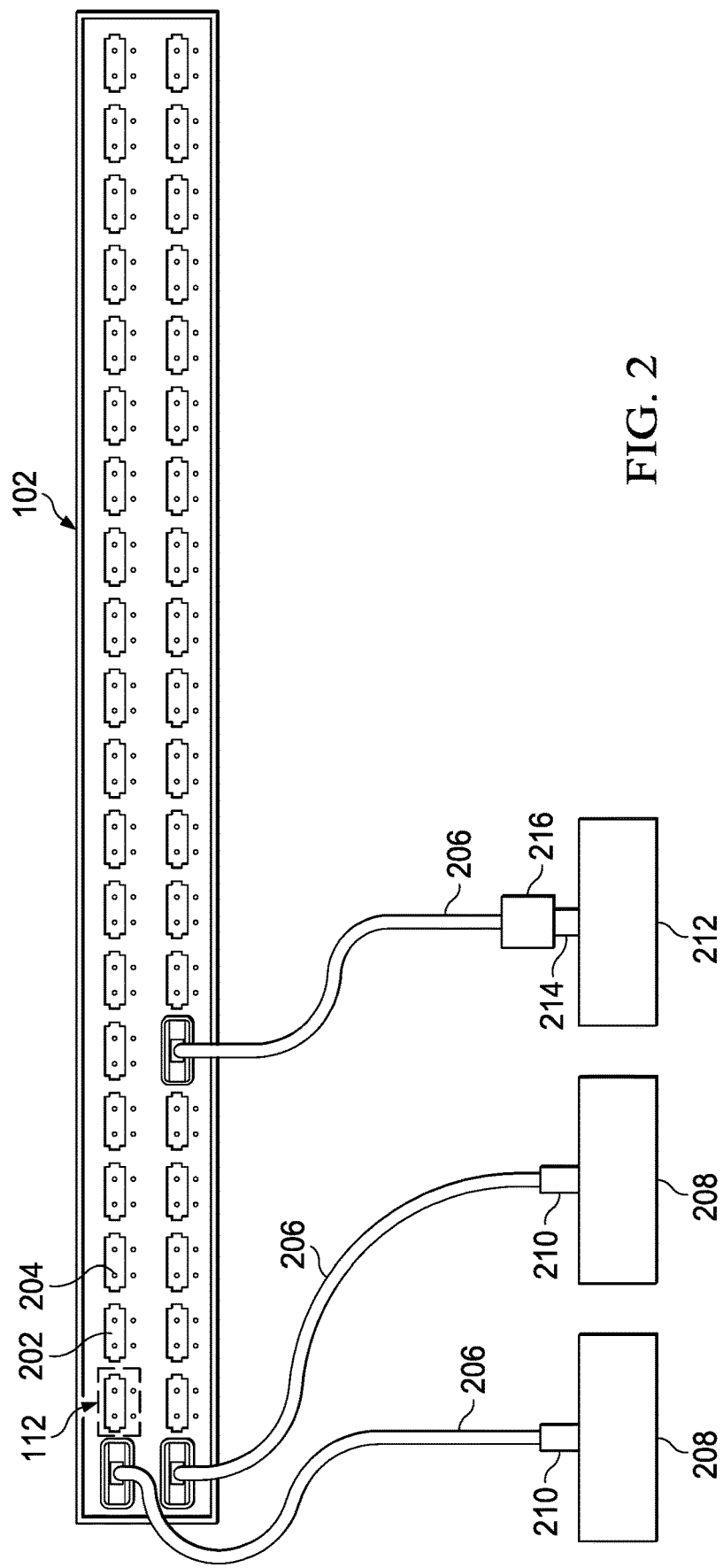
FIG. 2 illustrates an elevation view of a front panel of an example information handling system, in accordance with embodiments of the present disclosure.

Preferred embodiments and their advantages are best understood by reference to FIGS. 1 through 3, wherein like numbers are used to indicate like and corresponding parts. For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, and/or any other components and/or elements of an information handling system.

For the purposes of this disclosure, circuit boards may broadly refer to printed circuit boards (PCBs), printed wiring boards (PWBs), printed wiring assemblies (PWAs) etched wiring boards, and/or any other board or similar physical structure operable to mechanically support and electrically couple electronic components (e.g., packaged integrated circuits, slot connectors, etc.). A circuit board may comprise a substrate of a plurality of conductive layers separated and supported by layers of insulating material laminated together, with conductive traces disposed on and/or in any of such conductive layers, with vias for coupling conductive traces of different layers together, and with pads for coupling electronic components (e.g., packaged integrated circuits, slot connectors, etc.) to conductive traces of the circuit board.

FIG. 1 illustrates a functional block diagram of selected components of an example information handling system 102, in accordance with embodiments of the present disclosure. In some embodiments, information handling system 102 may be a personal computer (e.g., a desktop computer or a portable computer). In other embodiments, information handling system 102 may comprise a storage server for archiving data. In yet other embodiments, information handling system 102 may comprise a server. In further embodiments, information handling system 102 may comprise a network switch.

As depicted in FIG. 1, information handling system 102 may include a processor 103, a memory 104 communicatively coupled to processor 103, an input/output interface 106 communicatively coupled to processor 103, a user interface 110 communicatively coupled to processor 103, and a hybrid optical/electrical port 112 communicatively coupled to I/O interface 106.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104, and/or another component of information handling system 102.

Memory 104 may be communicatively coupled to processor 103 and may include any system, device, or apparatus configured to retain program instructions and/or data for a period of time (e.g., computer-readable media). Memory 104 may include random access memory (RAM), electrically erasable programmable read-only memory (EEPROM), a PCMCIA card, flash memory, magnetic storage, opto-magnetic storage, or any suitable selection and/or array of volatile or non-volatile memory that retains data after power to its associated information handling system 102 is turned off.

I/O interface 106 may comprise any suitable system, apparatus, or device operable to serve as an interface between information handling system 102 and one or more other external devices. For example, in some embodiments, I/O interface 106 may comprise a network interface configured to serve as an interface between information handling system 102 and information handling systems via a network, in which case I/O interface 106 may comprise a network interface card, or "NIC."

User interface 110 may comprise any instrumentality or aggregation of instrumentalities by which a user may interact with information handling system 102. For example, user interface 110 may permit a user to input data and/or instructions into information handling system 102, and/or otherwise manipulate information handling system 102 and its associated components. User interface 110 may also permit information handling system 102 to communicate data to a user, e.g., by way of a display device.

Hybrid optical/electrical port 112 may comprise a combination optical and electrical interface, having an optical connector (e.g., a multi-fiber push on or "MPO" connector) and an electrical connector. Accordingly, hybrid optical/electrical port 112 may be configured to receive a hybrid optical/electrical cable (e.g., a cable including optical fibers in parallel with wires constructed from copper or other conductive material), and thus may communicate data through the cable via its optical connector and deliver electrical energy via its electrical connector to a device coupled to hybrid optical/electrical port 112 via the cable.

Although FIG. 1 depicts information handling system 102 having only a single hybrid optical/electrical port 112, in many embodiments, especially in those in which information handling system 102 is a network switch, information handling system 102 may have a plurality of hybrid optical/electrical ports 112.

In addition to processor 103, memory 104, I/O interface 106, user interface 110, and hybrid optical/electrical port 112, information handling system 102 may include one or more other information handling resources. Such an information handling resource may include any component system, device or apparatus of an information handling system, including without limitation, a processor, bus, memory, I/O device and/or interface, storage resource (e.g., hard disk drives), network interface, electro-mechanical device (e.g., fan), display, power supply, and/or any portion thereof. An information handling resource may comprise any suitable package or form factor, including without limitation an integrated circuit package or a printed circuit board having mounted thereon one or more integrated circuits.

FIG. 2 illustrates an elevation view of a front panel of an example information handling system 102, in accordance with embodiments of the present disclosure. In particular, FIG. 2 illustrates a front panel of an information handling system 102 implemented as a network switch. As shown in FIG. 2, information handling system 102 may have a plurality of hybrid optical/electrical ports 112. As described above with reference to FIG. 1, a hybrid optical/electrical port 112 may comprise a combination optical and electrical interface, having an optical connector 202 (e.g., a multi-fiber push on or "MPO" connector) and an electrical connector 204.

As also shown in FIG. 2, some hybrid optical/electrical ports 112 of information handling system 102 may be coupled, via cables 206, to devices 208 having their own hybrid optical/electrical ports 210 for receiving cables 206.

Each cable 206 may comprise a hybrid optical/electrical cable including optical fibers in parallel with electrically-conductive wires. The optical wires may be configured to communicatively couple at a first end to an optical connector 202 of a hybrid optical/electrical port 112 and communicatively couple at a second end to an optical connector (not explicitly shown) of a hybrid optical/electrical port 210. The electrically-conductive wires (e.g., constructed from copper or other conductive material) may be configured to electrically couple at the first end to an electrical connector 204 of a hybrid optical/electrical port 112 and electrically couple at the second end to an electrical connector (not explicitly shown) of a hybrid optical/electrical port 210. Accordingly, each device 208 may communicate data with information handling system 102 via optical fibers of a cable 206 while receiving electrical energy for operating from a hybrid optical/electrical port 112 via electrical fibers of such cable 206.

As further shown in FIG. 2, some hybrid optical/electrical ports 112 of information handling system 102 may be coupled, via hybrid optical/electrical cables 206, to devices 212 having a legacy electrical port 214 (e.g., an RJ-45 port) having no optical interface. Thus, the legacy electrical port 214 may not be compatible with the optical interface of a hybrid optical/electrical cable 206. Accordingly, a converter 216 may be interfaced between cable 206 and legacy electrical port 214 to provide for conversion between hybrid optical/electrical port 112 and legacy electrical port 214, as further described below.

FIG. 3 illustrates a block diagram of an example hybrid optical/electrical port to legacy electrical port converter 216, in accordance with embodiments of the present disclosure. As shown in FIG. 3, converter 216 may include a circuit board 302 terminated with a hybrid optical/electrical connector 304 and also terminated with a legacy electrical connector 306. Hybrid optical/electrical connector 304 may include optical transmission media (e.g., optical fibers) and electrically-conductive conduits (e.g., copper pins) such that hybrid optical/electrical connector 304 may receive and couple to a cable 206. Legacy electrical connector 306 may include electrically-conductive conduits (e.g., copper pins) such that legacy electrical connector 306 may be received by and couple to a legacy electrical port 214.

As further shown in FIG. 3, circuit board 302 may include or may have mounted thereon a power mapping module 308 interfaced between hybrid optical/electrical connector 304 and legacy electrical connector 306 and may include or may have mounted thereon an integrated transceiver module and serializer/deserializer (SERDES) 310 interfaced between hybrid optical/electrical connector 304 and legacy electrical connector 306.

Power mapping module 308 may comprise any system, device, or apparatus configured to map the electrically-conductive conduits of hybrid optical/electrical connector 304 to electrically-conductive conduits of legacy electrical connector 306, such that a device 212 coupled to legacy electrical connector 306 may be powered from a cable 206 coupled to hybrid optical/electrical connector 304.

Integrated transceiver module and SERDES 310 may comprise any system, device, or apparatus configured to: (a) convert optical signals received by optical transmission media of hybrid optical/electrical connector 304 and convert such optical signals into equivalent electrical signals and drive such equivalent electrical signals to electrically-conductive conduits of legacy electrical connector 306; and (b) convert electrical signals received by electrically-conductive conduits of legacy electrical connector 306 and convert such electrical signals into equivalent optical signals and drive such equivalent optical signals to optical transmission media of hybrid optical/electrical connector 304, such that a device 212 coupled to legacy electrical connector 306 may communicate with a hybrid optical/electrical port 112 via cable 206. In addition to the conversion functionality described above, integrated transceiver module and SERDES 310 may also be configured to serialize and/or deserialize data as it is being converted in order to satisfy communications standards associated with hybrid optical/electrical connector 304 and legacy electrical connector 306.

In some embodiments, converter 216 may be integrated within cable 206.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. A hybrid optical/electrical port to electrical port converter, comprising:
   a hybrid optical/electrical connector, wherein the hybrid optical/electrical connector is a multi-fiber push on connector;
   an electrical connector; and
   a circuit electrically and communicatively coupled between the hybrid optical/electrical connector and the electrical connector, the circuit comprising:
      a power mapping module interfaced between the hybrid optical/electrical connector and the electrical connector and configured to map electrical power rails from electrically-conductive conduits of the hybrid optical/electrical connector to electrically-conductive conduits of the electrical connector, such that a device coupled to the electrical connector can be powered directly from a network via a cable coupled to the hybrid optical/electrical connector; and
      an integrated transceiver module interfaced between the hybrid optical/electrical connector and the electrical connector and configured to:
         convert optical signals received by optical transmission media of the hybrid optical/electrical connector and convert such optical signals into equivalent electrical signals and drive such equivalent electrical signals to electrically-conductive conduits of the electrical connector; and
         convert electrical signals received by electrically-conductive conduits of the electrical connector and convert such electrical signals into equivalent optical signals and drive such equivalent optical signals to the optical transmission media of the hybrid optical/electrical connector;
      such that the device can communicate with a hybrid optical/electrical port of an information handling system via the cable.

2. The hybrid optical/electrical port to electrical port converter of claim 1, the circuit further comprising a serializer/deserializer configured to serialize and/or deserialize data as it is being converted by the integrated transceiver module in order to satisfy communications standards associated with the hybrid optical/electrical connector and the electrical connector.

3. The hybrid optical/electrical port to electrical port converter of claim 2, wherein the serializer/deserializer is integrated with the integrated transceiver module.

4. The hybrid optical/electrical port to electrical port converter of claim 1, wherein the electrical connector is an RJ-45 connector.

5. A method for fabricating a hybrid optical/electrical port to electrical port converter, wherein the hybrid optical/electrical connector is a multi-fiber push on connector, the method comprising:
   electrically and communicatively coupling a circuit between a hybrid optical/electrical connector and an electrical connector, wherein the circuit comprises:
      a power mapping module interfaced between the hybrid optical/electrical connector and the electrical connector and configured to map electrical power rails from electrically-conductive conduits of the hybrid optical/electrical connector to electrically-conductive conduits of the electrical connector, such that a device coupled to the electrical connector can be powered directly from a network via a cable coupled to the hybrid optical/electrical connector; and
      an integrated transceiver module interfaced between the hybrid optical/electrical connector and the electrical connector and configured to:
         convert optical signals received by optical transmission media of the hybrid optical/electrical connector and convert such optical signals into equivalent electrical signals and drive such equivalent electrical signals to electrically-conductive conduits of the electrical connector; and
         convert electrical signals received by electrically-conductive conduits of the electrical connector and convert such electrical signals into equivalent optical signals and drive such equivalent optical signals to the optical transmission media of the hybrid optical/electrical connector;

such that the device can communicate with a hybrid optical/electrical port of an information handling system via the cable.

6. The method of claim 5, the circuit further comprising a serializer/deserializer configured to serialize and/or deserialize data as it is being converted by the integrated transceiver module in order to satisfy communications standards associated with the hybrid optical/electrical connector and the electrical connector.

7. The method of claim 6, wherein the serializer/deserializer is integrated with the integrated transceiver module.

8. The method of claim 5, wherein the electrical connector is an RJ-45 connector.

* * * * *